United States Patent
Sedar et al.

(10) Patent No.: US 10,091,253 B2
(45) Date of Patent: Oct. 2, 2018

(54) AUTOMATIC EQUIPMENT CONFIGURATION FOR MEETINGS

(71) Applicant: Microsoft Technology Licensing, LLC, Redmond, WA (US)

(72) Inventors: Christopher Sedar, Seattle, WA (US); Paul Valentin Borza, Redmond, WA (US); Ovidiu Dan, Kirkland, WA (US); Vaibhav Parikh, Bothell, WA (US); Kumar Srinivasamurthy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 14/746,821

(22) Filed: Jun. 22, 2015

(65) Prior Publication Data

US 2016/0373490 A1    Dec. 22, 2016

(51) Int. Cl.
*H04L 29/06* (2006.01)
*H04L 29/08* (2006.01)
*G06Q 10/10* (2012.01)

(52) U.S. Cl.
CPC ....... *H04L 65/1069* (2013.01); *G06Q 10/109* (2013.01); *G06Q 10/1093* (2013.01); *G06Q 10/1095* (2013.01); *H04L 65/4007* (2013.01); *H04L 67/18* (2013.01)

(58) Field of Classification Search
CPC ......... H04N 21/47202; H04N 21/4788; H04N 7/17318; G06F 17/30038; G06F 15/16
USPC ............................ 709/204; 370/311; 270/311
See application file for complete search history.

(56) References Cited

U.S. PATENT DOCUMENTS

| | | | |
|---|---|---|---|
| 6,865,372 B2 * | 3/2005 | Mauney | H04M 1/72519 455/41.2 |
| 7,848,703 B1 * | 12/2010 | Beard | H04W 76/14 455/41.2 |
| 8,483,375 B2 | 7/2013 | Dhara et al. | |
| 8,717,400 B2 | 5/2014 | Ranganath et al. | |
| 2009/0210490 A1 | 8/2009 | Hawkins et al. | |
| 2009/0285130 A1 | 11/2009 | Knaz | |

(Continued)

OTHER PUBLICATIONS

"International Search Report and Written Opinion Issued in PCT Application No. PCT/US2016/037948", dated Oct. 11, 2016, 13 Pages.

(Continued)

*Primary Examiner* — Tesfay Yohannes
(74) *Attorney, Agent, or Firm* — Holzer Patel Drennan (57) ABSTRACT

The act of setting up a user's device to participate in a meeting may be performed automatically, using location information and calendar information. With appropriate permission obtained from the user, the user's calendar and the location of the user's device are monitored. When the user's calendar indicates that the user is scheduled to be in a meeting and the user is in or approaching a conference room (or other type of room) associated with that meeting, the user's desktop, application, and meeting documents may be shared. The user's computer may be automatically connected to devices in the meeting room, and any audio/visual settings appropriate for the user's role in the meeting may be configured automatically. Alternatively, if the user is to participate in the meeting online, the online meeting may be joined automatically.

20 Claims, 5 Drawing Sheets

(56) References Cited

U.S. PATENT DOCUMENTS

| | | | |
|---|---|---|---|
| 2010/0110948 A1* | 5/2010 | Batta | G01S 5/06 370/311 |
| 2010/0246448 A1 | 9/2010 | Krantz et al. | |
| 2010/0319023 A1* | 12/2010 | Ko | H04N 7/17318 725/37 |
| 2011/0055782 A1* | 3/2011 | Drennan | G06F 17/5068 716/112 |
| 2011/0271129 A1 | 11/2011 | Flannagan et al. | |
| 2012/0185291 A1 | 7/2012 | Ramaswamy et al. | |
| 2012/0296986 A1 | 11/2012 | Hassan et al. | |
| 2012/0327175 A1 | 12/2012 | Couse | |
| 2013/0024576 A1 | 1/2013 | Dishneau et al. | |
| 2013/0235146 A1 | 9/2013 | Schaefer et al. | |
| 2013/0237240 A1 | 9/2013 | Krantz et al. | |
| 2014/0025679 A1 | 1/2014 | Mallet et al. | |
| 2014/0073300 A1 | 3/2014 | Leeder et al. | |
| 2014/0279140 A1* | 9/2014 | Kar | G06Q 30/08 705/26.3 |
| 2015/0141005 A1 | 5/2015 | Suryavanshi et al. | |
| 2015/0215747 A1* | 7/2015 | Kemmerer, Jr. | H04W 4/50 455/518 |
| 2015/0317781 A1* | 11/2015 | Napier | G01S 17/023 348/46 |

OTHER PUBLICATIONS

"Windows Vista Windows Meeting Space Step by Step Guide", Published on: Feb. 27, 2011 Available at: http://technet.microsoft.com/en-us/library/cc721942(v=ws.10).aspx, 18 pages.

"The Lync Room System", Published on: Feb. 19, 2013 Available at: http://blogs.technet.com/b/lync/archive/2013/02/19/the-lync-room-system-lrs.aspx, 9 pages.

"International Preliminary Report on Patentability Issued in PCT Application No. PCT/US2016/037948", dated Aug. 18, 2017, 9 Pages.

"Second Written Opinion Issued in PCT Application No. PCT/US2016/037948", dated May 24, 2017, 6 Pages.

\* cited by examiner

AUTOMATIC EQUIPMENT CONFIGURATION FOR MEETINGS

BACKGROUND

When people participate in meetings that use computer equipment and other electronic equipment, those people typically have to set up the equipment manually. If the meeting is set up to gather the participants in a physical location such as a conference room, then a participant typically walks to the conference room with his or her computer, connects the computer to the wired or wireless internet access point in the room, and opens any conference software that is needed to participate in the meeting. If the participant is also the presenter for the meeting, then he may connect his computer to a projector or to a display, may set the audio and video settings on the computer, and may perform any other setup that is needed in order to function as the presenter at the meeting. This setup is typically performed manually by the participant, after entering the conference room. Even if the participant joins the meeting online instead of in a physical conference room, the participant manually invokes the conference software and makes the appropriate audio/visual configurations needed to participate in the meeting. Manually setting up a device for participation in a meeting involves an expenditure of time and effort on the part of the participant.

SUMMARY

Setting up a user's device (or plural devices belonging to the same user) so that the user can participate in a meeting may be performed automatically using information that is available from the user's schedule and from the physical environment, if any, in which the meeting has been scheduled to occur. When a meeting is scheduled to occur, this fact may be ascertainable from the fact that the user is approaching a conference room (or other type of room where a meeting would take place) and/or from the fact that the meeting appears on the user's calendar. A meeting and presence component may monitor the user's calendar and/or the user's movements to determine when the user is scheduled to participate in a meeting and/or when the user is nearing (or is already in) a conference room in which the meeting is occurring. (Prior to accessing the user's location and calendar, permission may be obtained from the user in order to preserve the user's interest in privacy.) If the user is to participate in the meeting online instead of in person, the fact that the user will participate in the meeting may be detected from the user's calendar rather than from information about the user's location.

Once it has been determined, from the user's location and/or calendar, that the meeting is imminent, the user's device(s) may be automatically configured for participation in the meeting. Conference software may be started, and the user may be connected to any devices that are needed for the meeting. Moreover, the calendar entry for the meeting may indicate whether the user is a presenter or a participant, and which documents or applications are needed for the meeting. If the user is a presenter, the user may be automatically connected to a conference room projector, the user's microphone may be turned on, and the user's webcam, desktop, relevant applications, and documents may be shared automatically. If the user is a non-presenter participant, conference software may be started and the user's microphone may be automatically muted.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Meetings typically involve some setup of equipment. If the meeting is to take place in a conference room (or some other type of room where meetings can occur), the presenter generally connects his laptop or other device to a projector in the conference room, and uses conference software to share documents, applications, videos, etc., with the audience. Moreover, the user may bring several different devices into the conference (e.g., laptop, phone, connected watch, etc.) and may wish to use any combination of these devices to participate in the meeting. Any non-presenter participants may use conference software to participate in the meeting to view information that the presenter is sharing. If someone participates online, then conference software is generally used to facilitate online participation. Setting up the software to participate in the meeting, connecting the user's device(s) to the appropriate equipment, sharing documents, and configuring the audio/visual settings takes time and effort. This is time and effort that need not be spent, since much of the information as to what needs to be set up, and at what time, is often readily available, so these tasks can be performed automatically.

Setting up a user's devices so that the user can participate in a meeting may be performed automatically using information that is available from the user's schedule and from the physical environment in which the meeting occurs. When a meeting is scheduled to occur, this fact may be ascertainable from the fact that the user is approaching a conference room and/or from the fact that the meeting appears on the user's calendar. A meeting and presence component may monitor the user's calendar and/or the user's movements to determine when the user is scheduled to participate in a meeting and/or when the user is nearing (or already in) a conference room in which the meeting is occurring. (Access to the user's location and calendar may be made after obtaining the user's permission in order to preserve the user's interest in privacy.) If the user is to participate in the meeting online instead of in person, the fact that the user will participate in the meeting may be detected from the user's calendar rather than from information about the user's location.

Once it has been determined that the meeting is imminent—from the user's location in or near a conference room, and/or from information on a calendar—the user's devices may be automatically configured for participation in the meeting. Conference software may be started, and the user may be connected to any devices that are needed for the meeting. Moreover, the calendar entry for the meeting may indicate whether the user is a presenter or a participant, and which documents or applications are needed for the meeting. If the user is a presenter, the user may be automatically connected to a conference room projector, the user's microphone may be turned on, and the user's webcam, desktop, relevant applications, and documents may be shared automatically. If the user is a non-presenter participant, conference software may be started and the user's microphone may be automatically muted. Moreover, the user's various devices may all be connected so that the user can participate in the meeting in different ways. For example, the user may wish to use his laptop to view the meeting and to scroll through slides, but may wish to speak into his watch as a microphone rather than using the laptop's microphone. Or, the user may wish to use his watch as a remote control to scroll through the slides, but may wish to use his phone as a microphone, while also viewing the slides on his laptop. The particular device that is chosen for audio may be based on how well the microphones on the different devices are picking up the user's voice. The particular device that is chosen to control scrolling through slides may be based on user preference, possibly learned through prior interactions with the user. Various scenarios are possible in which a user uses a combination of devices to participate in a conference, all of which may be automatically connected using the techniques herein.

Figure 1:
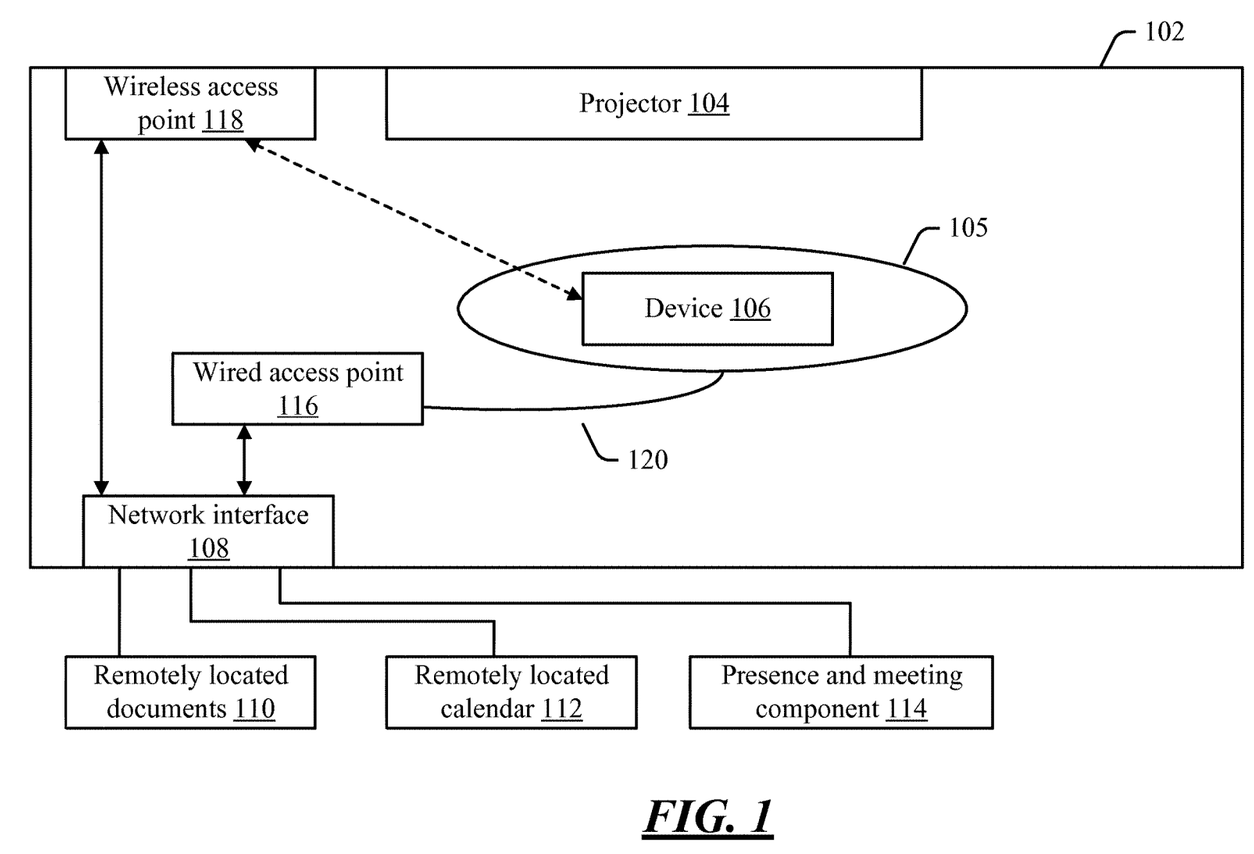
FIG. 1 is a block diagram of a first example physical environment in which a conference may occur.

FIG. 1 shows an example physical environment in which a conference may occur. FIG. 1 may be interpreted as a top view of a conference room, although it will be understood that conferences may occur in other physical environments, such as a restaurant, a hotel, an outdoor meeting venue, etc.

Conference room 102 may have a projector 104 and a conference table 105. FIG. 1 shows, and is described in terms of, a conference room, although it will be understood that the techniques provided herein may be used for conferences that are to take place in other types of room, such as media room, a family room, a connected kitchen in a participant's house, an office, etc., or any other type of room where a meeting may occur. A user who enters conference room 102 may carry a device 106, which may be a laptop computer, a table, a phablet, a phone, a watch, virtual reality lenses, etc. The user may carry several devices, all of which may be connected using the techniques described herein. Conference room 102 may have a network interface 108 that delivers information from the internet, or from a private network such as an intranet, to conference room 102. Some examples of information that may come from one of these networks are remotely located documents 110 and remotely located calendar 112. Additionally, network interface 108 may allow devices in or near conference room 102 to communicate with a presence and meeting component 114, whose function is discussed below. Conference room 102 may have a wired access point 116 and a wireless access point 118, which allow devices in or near conference room (such as device 106) to communicate with network interface 108. In the example shown in FIG. 1, device 106 is connected to a wired access point 116 through cord 120, although device 106 could, alternatively, communicate with a network through wireless access point 118 using technologies such as WiFi, WiMAX, etc.

Conference room 102, or some similar physical environment, exists at a location, such as within an office building, within a hotel, within a conference center, etc. A person who is planning to participate in a meeting in conference room 102 is, at any given point in time, at some physical location relative to conference room 102. The person's proximity to conference room 102, as well as any information about the person's current and/or planned conference attendance as gleaned from that person's calendar, may be used to determine when the person's participation in a conference is imminent. That imminence may be used to pre-load software and/or to pre-configure any devices that may be used for the conference. This pre-loading and/or pre-configuring may be managed by presence and meeting component 114, which monitors the user's device for proximity to conference room 102, as well as monitoring the user's calendar to determine when the user appears to have a meeting scheduled in conference room 102. (Any monitoring of the user's location and/or the user's calendar may be performed pursuant to appropriate permission obtained from the user, in order to protect the user's legitimate interest in privacy.) While the user's calendar is shown in FIG. 1 as being remotely located, presence and meeting component 114 may monitor a calendar that is stored locally on the user's device, or a calendar that is stored at any other location.

Not all meetings involve participants meeting in a conference room. In some cases, meetings take place online using conferencing software. In other cases, some participants join the meeting in the conference room, and others participate online. As will be shown below, the components shown in FIG. 1 may be used to facilitate participation in a meeting, regardless of whether a given person will participate in an assigned physical conference room or will participate online.

Figure 2:
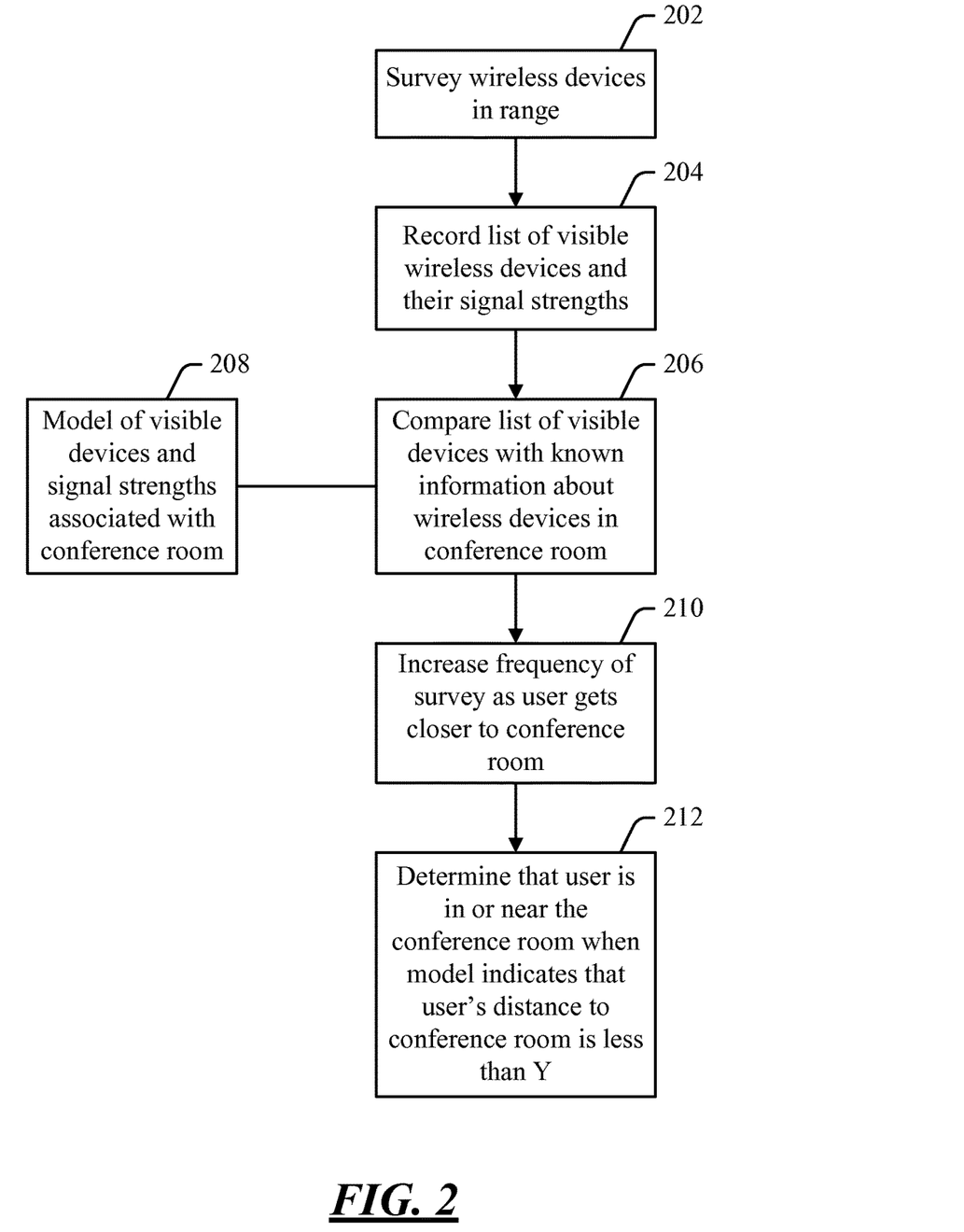
FIG. 2 is a flow diagram of an example process of discovering whether a user is near a meeting location.

Presence and meeting component 114 may help a user to participate in a meeting by opening the appropriate applications and documents as the user approaches a meeting location. FIG. 2 shows an example process of discovering whether a user is near a meeting location. At 202, proximity of a user's device to a location such as a conference room may be detected by surveying the wireless devices that are within range of the user's device. Wireless devices include devices that use WiFi, WiMAX, Bluetooth, etc. At 204, a list is recorded of the identifiers of visible wireless devices, and the signal strengths of those devices.

At 206, the list of visible devices is compared with known information about which wireless devices would be visible to a device that is actually in or near the conference room. For example, when a particular reference device (e.g., laptop, tablet, phone, etc.) is known to be in the conference room, a list of those devices that are visible to the reference device, and their various signal strengths, may be collected. By collecting this information from several user devices that have entered the conference room, a model of visible devices and signal strength (block 208) may be built. The model shows the list of devices that would be visible to a user device that has entered the conference room, and the likely signal strengths that would be experienced by that user device. This model may be used in the comparison performed at block 206; comparing the devices/signal strengths visible to a user's device with a historical model of devices/signal strengths that were visible to devices known to be in the conference room will allow a system to determine the likelihood that the user's device is in, or is approaching, the conference room. The model may correlate particular device lists/signal strengths with a particular distance from the conference room. That is, in addition to predicting a list of devices and signal strengths that would apply to a device that is actually in the conference room, the model may contain information that shows what device list/signals strengths would be visible to a user's device that is, say, ten meters away from the conference room in a particular hallway. As a specific example, the model might say that if devices A, B, and F are visible at signal strength levels of 4, 11, and 8, respectively, this fact indicates that the user is in the hallway, ten feet from the conference room The comparison at 206 may be performed repeatedly to determine the location of the user's device. When the result of that comparison begins to suggest that the user is getting closer to the conference room, the frequency of surveying visible wireless devices may increase (block 210). For example, there may be a rule that, when the user's device appears to be within X meters of the conference room, the frequency of surveying visible devices will increase. This increase in frequency may improve accuracy as to the determination of when the user has entered or is getting close to the conference room. At some point, the survey of visible devices will show a device list/signal-strength list that is consistent with very close proximity to the conference room. When this occurs, the process of FIG. 2 will determine that the user is in the conference room, or is about to enter the conference room (block 212). For example, the process may declare that the user is about to enter the conference room when the user's distance to the conference room appears to be Y meters or less (where Y meters may be a distance that is less than X meters, mentioned above in connection with block 210).

The process in FIG. 2 may be used to determine when a user is entering, or has entered, a conference room by using wireless connectivity to determine the approximate location of the user's device. However, wired connections may also be used to determine whether a user is in a conference room, simply by determining which devices the user has connected to. For example, if there is a projector in the conference room and the user connects his computer, via a cord, to that projector, then the user may be determined to be in the conference room in which the projector is located. Determining the user's location, based on the identity of devices to which the user's device has connected, may be accomplished as long as the devices that are in a conference room have identifiers that can be strongly associated with those devices. The identifiers need not be unique, since any uncertainty can be accounted for by a predictive model. For example, if a user connects his laptop to devices in a conference room, and if those devices provide the user's laptop with identifiers such as A11, B27, and C56, it does not matter if there are other devices somewhere in the world that have these same identifiers, since the fact that these particular three identifiers are on devices that are present in the same room as each other may be sufficient to identify the room from these non-unique identifiers. That is, A11 may be an identifier shared by several projectors, but it might be unlikely that a projector with identifier A11, a sound system with identifier B27, and a wireless router with identifier C56 all occur in the same room as each other. The unlikelihood of this co-occurrence may be used to determine that a laptop that can see all three of these devices is likely to be in a particular conference room that is known to contain all of these devices.

Figure 3:
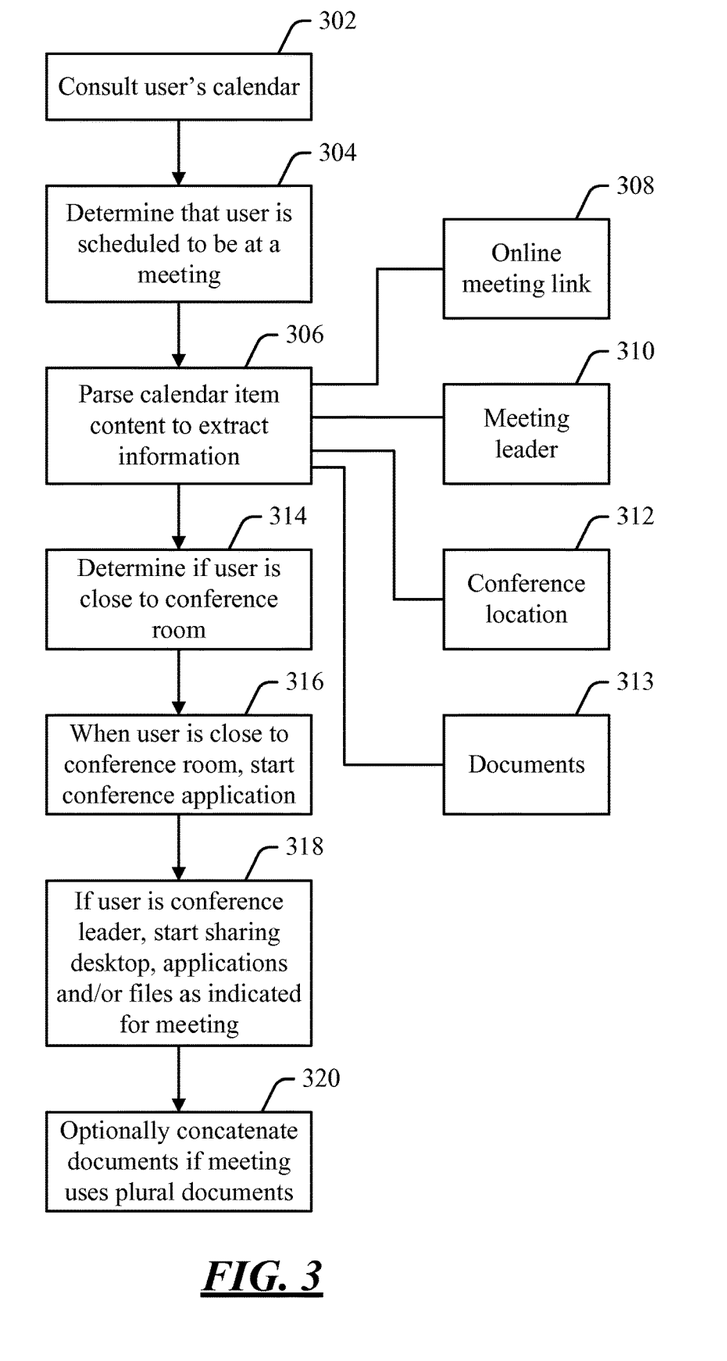
FIG. 3 is a flow diagram of an example in which a system automatically sets up a user for a conference.

One purpose of determining whether a user's device is in or near a conference room is so that a system can automatically join the conference, can automatically share any documents or applications that will be used in the conference, automatically set up the audio and/or video, or perform any other tasks. Using the techniques described above allow a system to perform these tasks automatically at the appropriate time, and having these tasks performed automatically serves at least the goals of reducing labor on the part of the user, and increasing efficiency of both the user and the user's equipment. When a system that can perform these tasks is at a high level of functioning, a user who has a conference may simply be able to walk into a conference room and start talking, without having to do any setup for the conference. FIG. 3 shows an example of how a system may automatically set up a user for a conference.

At 302, the user's calendar may be periodically consulted. (Access to the user's calendar may be obtained with permission from the user, in order to preserve the user's interest in privacy.) At 304, it is determined based on the calendar entry that the user is scheduled to be in a meeting currently, or at some time in the near future. Once it has been determined that the user is scheduled to be in a meeting, the calendar entry for the meeting may be parsed to extract certain information (at 306). The calendar entry for the meeting may identify various aspects of the meeting. For example, the entry may contain a link to participate in an online meeting (block 308). The entry may identify the leader of the meeting (block 310). The entry may identify a physical location for the meeting, such as a particular conference room (block 312). The entry may identify particular documents that will be used in the meeting (block 313). Any of this information may be extracted from the calendar entry for the meeting.

If the meeting is to take place at a physical location, it may be determined at 314 whether the user is in or near the conference room. This determination may be made using the process of FIG. 2. Another way to make this determination is to identify devices, such as a projector, to which the user's device has become connected to by wire, as described above. Another way to make this determination via geolocation, such as via a Global Positioning System (GPS) receiver in the user's device. (Permission may be obtained from a user prior to using GPS equipment to determine the user's location, in order to preserve the user's interest in privacy.)

At 316, when it is determined that the user is near or in a conference room in which the meeting is to take place, then conference application software may be started. If the user is the conference leader, then the user's desktop, or any needed applications, or any needed files, may automatically be shared at 318. Whether the user is the conference leader may be determined from information contained in the calendar entry for the meeting. Likewise, which applications and/or files are needed for the meeting may be ascertainable from the calendar entry for the meeting. In one example, any documents that are needed for the meeting may optionally be concatenated (at 320), in order to present the meeting documents as a single document.

In one example, the user's calendar may be consulted at fixed time intervals to determine whether the user is scheduled to be in a meeting. In another example, instead of consulting the user's calendar at fixed time intervals, the system first attempts to detect whether the user is in the proximity of any conference room, and then uses this fact as a trigger to check the user's calendar to determine what, if any, meeting the user is scheduled to be in. In yet another example, if the user is scheduled to join an online conference, or is scheduled to participate online in a conference that is taking place at a specific location for other participants, the fact that the user's calendar shows that the user is scheduled to participate in the conference can be used to connect the user to the online conference automatically.

When a conference is to be joined, the user's device can be connected to wireless devices that are to be used in the conference, such as projectors and/or displays. The list of wireless devices that are within range of the user's device may be consulted to determine whether a wireless projector or display is available. If such a projector and/or display is in range, the user's device can be directed to connect to that projector or display, and to display the desktop, documents, or other relevant conference materials on that projector or display. This action would be appropriate, for example, if the user is the conference leader, or a presenter in the conference. In another scenario, the user's device may have been connected to a particular projector or display in the past, in which case a system may assume that the user's device is to be connected to the same projector or display the next time the user is scheduled for a conference and that projector or display is within wireless communication range of the user's device. In yet another scenario, if there is a plurality of wireless projectors or displays in a conference room, a system can present a list of potential devices and allow the user to choose which one to connect to.

Figure 4:
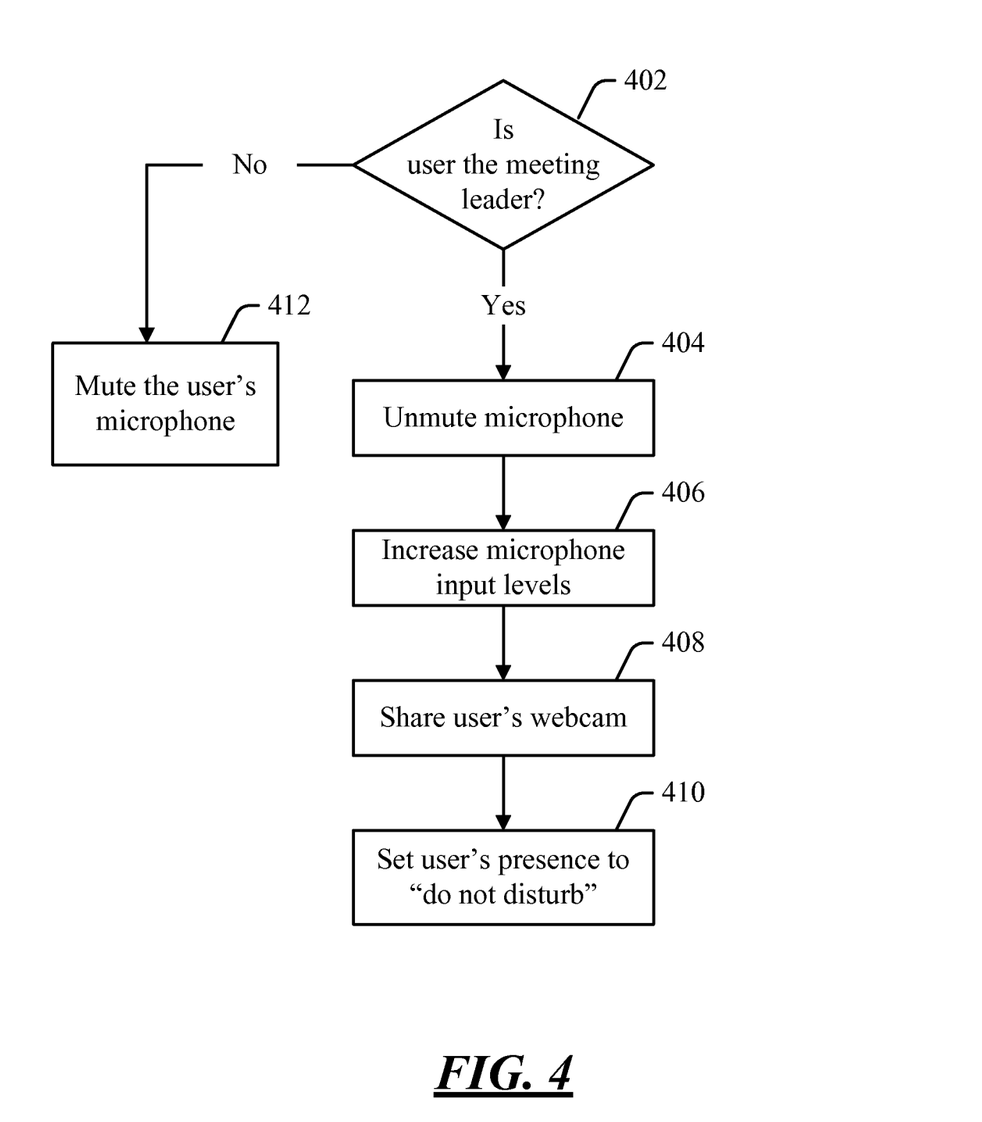
FIG. 4 is a flow diagram of an example process of adjusting audio/visual settings when a user joins a conference.

When automatically joining a conference, audio/visual (A/V) settings can be adjusted depending on the user who is joining the conference. FIG. 4 shows an example process of adjusting A/V settings when the user joins the conference.

At 402, it is determined whether the user is a conference leader. A reason to determine whether the user is the conference leader is that the A/V settings may be different depending on whether the user will be doing much of the speaking and presenting (as in the case where the user is the leader), or whether the user will primarily be listening with either no participation or occasional participation (as in the case where the user is a non-leader participant). If the user is not the leader, then the system may mute the user's microphone (at 412). In this way, determining whether the user is or is not the leader may serve at least the goal of securing the flow of information—e.g., not broadcasting the user's voice when the user is not expecting to be engaging in public communication.

If the user is the leader, then the system may take various actions to prepare the A/V environment for the user to speak and present. The system may un-mute the microphone (at 404). Additionally, the system may increase the microphone input level, to an intensity that would be appropriate for a primary presenter in a conference (at 406). If an image of the presenters face is to be shown on monitors in the conference room, or to online participants, then the system may start and share the user's webcam (at 408). The system may also set the user's presence to "do not disturb" (at 410) so that others who are trying to contact the user while he or she is presenting at a meeting will receive an indication that the user is unavailable. (Sharing the user's voice and/or image may be done after obtaining appropriate permission from the user, in order to preserve the user's interest in privacy.)

It is noted that presence and meeting component 114 (shown in FIG. 1) may perform the acts of detecting whether a user is approaching a conference room, monitoring the user's calendar to determine when the user is scheduled to be in a meeting, automatically starting applications, automatically sharing documents, automatically configuring A/V settings, or any other actions related to the automatic preparation of a user's device for participation in a meeting. Presence and meeting component 114 (shown in FIG. 1) may exist as a service on a computer remote from the user's device, or may exist on the user's device, or may be distributed across several devices.

In addition to setting up the audio/video settings for a single device, if a user has plural devices the system may set up the devices to be used for various purposes. For example, if the user is the presenter and has a laptop, a phone, a watch, and virtual reality glasses, the system may set up the laptop to view the conference materials while also muting the laptop's microphone, so that the user's phone can be used as a microphone and the user's watch may be used as a control to scroll through the slides, and the virtual reality glasses may show a pre-written script as a form of teleprompter. Or, the system may turn off the display on the virtual reality glasses and set the phone to "do not disturb" mode so that the user will not be distracted during the meeting, and then may set up the laptop as a viewing screen and the watch as a microphone. The user's preferences may be learned from prior conferences, or the particular choice of devices to perform various functions may be based on conditions determined at the time of the conference (e.g., the device that is picking up the loudest audio may be chosen as the audio input device, while muting other devices). Various scenarios are possible, depending on which device the user has available, the user's prior expressed or learned preferences, or factors that are present at the time and place of the conference.

Figure 5:
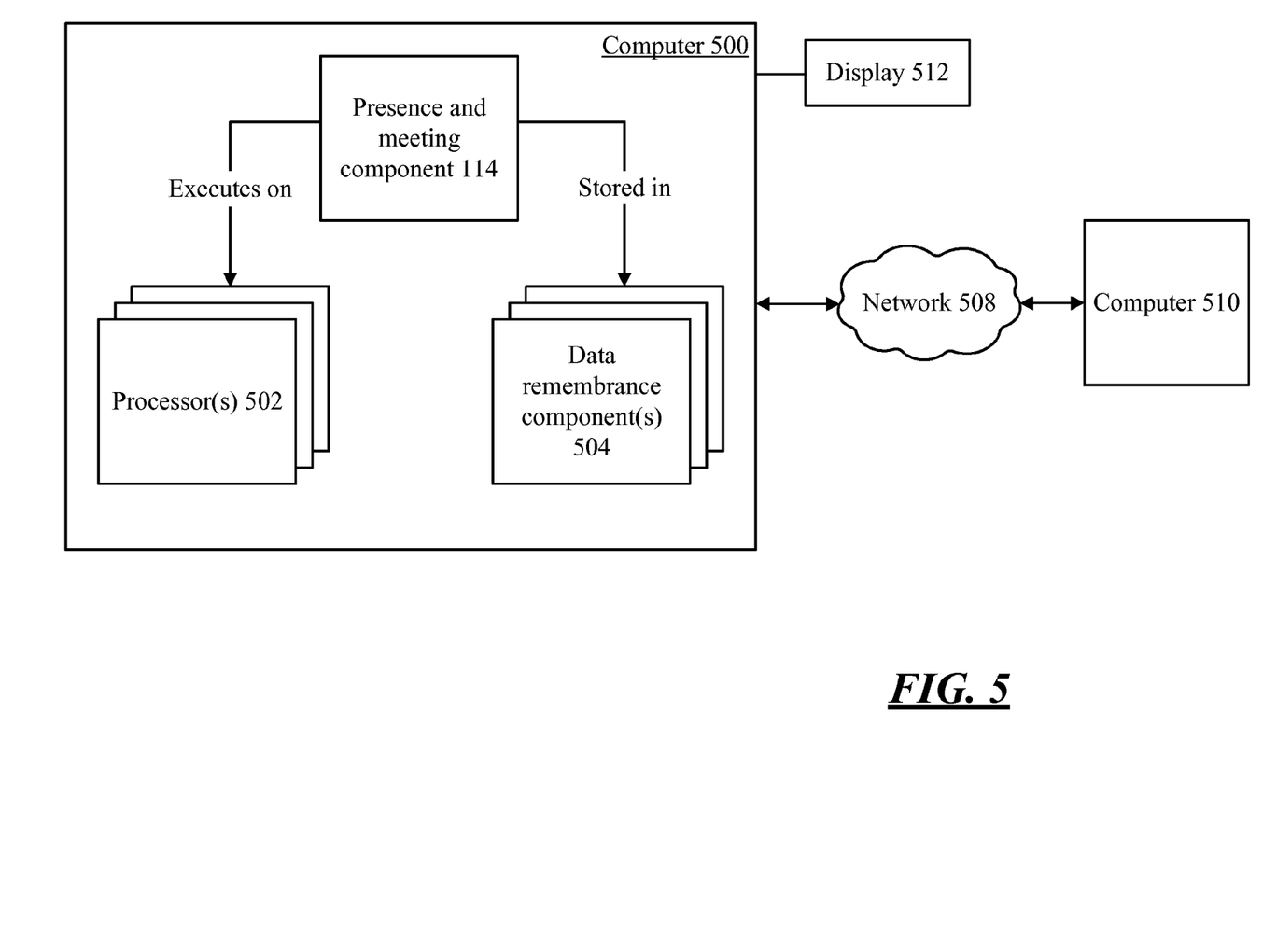
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is presence and meeting component 114, which may implement some or all of the functionality described above in connection with FIGS. 1-4, although any type of software could be used. Presence and meeting component 114 may be implemented, for example, through one or more sub-components, which may be components in a distributed system, separate files, separate functions, separate objects, separate lines of code, etc. A computer (e.g., personal computer, server computer, handheld computer, tablet, phablet, smart phone, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium.

The term "computer-readable media" does not include signals per se; nor does it include information that exists solely as a propagating signal. It is noted that there is a distinction between media on which signals are "stored" (which may be referred to as "storage media"), and—in contradistinction—media that exclusively transmit propagating signals without storing the data that the signals represent. DVDs, flash memory, magnetic disks, etc., are examples of storage media. On the other hand, the fleeting, momentary physical state that a wire or fiber has at the instant that it is transmitting a signal is an example of a signal medium. (Wires and fibers can be part of storage media that store information durably, but information that exists only as the fleeting excitation of electrons in a wire, or only as the pulse of photons in a fiber, constitutes a signal.) It will be understood that, if the claims herein refer to media that carry information exclusively in the form of a propagating signal, and not in any type of durable storage, such claims will use the term "signal" to characterize the medium or media (e.g., "signal computer-readable media", or "signal device-readable media"). Unless a claim explicitly uses the term "signal" to characterize the medium or media, such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form, and that store information durably; such "hardware media" or "tangible media" are not signals per se, are not propagating signals, and these terms do not refer media in which information exists exclusively as a propagating signal. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

In one example, the subject matter herein provides a computer-implemented method of configuring equipment for a meeting, where method comprises: surveying devices that are within wireless communication range of a first computer; creating a list of the devices that are within the wireless communication range of the first computer and respective signal strengths of the devices; using a model to determine the computer's physical proximity to a room in which the meeting is scheduled to take place, the model comprising data that represents a relationship between identities of devices that are within communication range of a given computer, signal strengths of those devices, and physical proximity of the given computer to the room; determining, based on use of the model, that the first computer is within a first distance of the room, the first computer being a user's device; and based on the first computer being within the first distance of the room, taking an action to have the user join the prior to the first computer being in the room. The method may also comprise: determining that the user is a leader of the meeting; and based on the user being the leader of the meeting, unmuting a microphone of the first computer, sharing the first computer's webcam, and setting the user's presence to indicate that the user is not to be disturbed. The method may also comprise: determining that the user is not a leader of the meeting; and based on the user not being the leader of the meeting, muting the first computer's microphone. The method may also comprise increasing a frequency at which the surveying of the devices occurs based on a finding that the first computer is within a second distance of the room, the second distance being greater than the first distance. The method may also comprise: using a calendar of the user to determine that the user is scheduled to be in the meeting, the calendar indicating a location of the meeting. The user may have a plurality of devices, said first computer being one of said plurality of devices, there being a plurality of functions to be performed during said meeting, the method further comprising: determining that said first computer is to be used to perform a first one of said functions; determining that said plurality of devices other than said first computer are to be used to perform said plurality of functions other than said first function; configuring said plurality of device to perform respective functions that said plurality of devices have been chosen to perform. The action referred to above may comprise connecting the first computer to projection or display equipment in the room, sharing the first computer's desktop with participants in the meeting, and sharing documents to be used in the meeting.

In another example, the subject matter herein provides a computer-readable medium comprising executable instructions to configure equipment for a meeting, the executable instructions, when executed by a first computer, causing the first computer to perform acts comprising: surveying devices that are within wireless communication range of the first computer; creating a list of the devices that are within the wireless communication range of the first computer and respective signal strengths of the devices; using a model to determine the computer's physical proximity to a room in which the meeting is scheduled to take place, the model comprising data that represents a relationship between identities of devices that are within communication range of a given computer, signal strengths of those devices, and physical proximity of the given computer to the room; determining, based on use of the model, that the first computer is within a first distance of the room; and based on the first computer being within the first distance of the room, starting a application on the first computer, sharing an application or desktop of the first computer, sharing documents, connecting the first computer to equipment in the room, or configuring audio or visual settings of the computer. The acts performed by the instructions may also determine that the user is a leader of the meeting; and, based on the user being the leader of the meeting, unmute a microphone of the first computer, sharing the first computer's webcam, and setting the user's presence to indicate that the user is not to be disturbed. The first computer may be a user's device, and the acts performed by the instructions may determine that the user is not a leader of the meeting; and, based on the user not being the leader of the meeting, may mute the first computer's microphone. The acts performed by the instructions may increase a frequency at which the surveying of the devices occurs based on a finding that the first computer is within a second distance of the room, the second distance being greater than the first distance. The first computer may be a user's device, and the acts performed by the instructions may use a calendar of the user to determine that the user is scheduled to be in the meeting, the calendar indicating a location of the meeting. The calendar may identify a leader of the meeting and the documents that are to be used for the meeting. There may be a user who participates in said meeting, said user having a plurality of devices, said first computer being one of said user's devices, said acts further comprising: assigning different ones of said plurality of devices to perform different tasks for said user during said meeting.

In another example, the subject matter herein provides a system for configuring equipment for a meeting, the system comprising: a memory; a processor; and a component that is stored in the memory, that executes on the processor, and that is configured to retrieve a calendar of a user, the component being further configured to determine that the user is scheduled to be in a meeting, the component being further configured to start an application, the component being further configured to automatically share a desktop of a first computer with participants in the meeting, or to automatically share an application with participants in the meeting, or to automatically share documents identified in the calendar with participants in the meeting. The component may be further configured to survey devices that are within wireless communication range of the first computer. The component may be further configured to create a list of the devices that are within the wireless communication range of the first computer and respective signal strengths of the devices. The component may be further configured to use a model to determine the computer's physical proximity to a room in which the meeting is scheduled to take place, the model comprising data that represents a relationship between identities of devices that are within communication range of a given computer, signal strengths of those devices, and physical proximity of the given computer to the room. The component may be further configured to determine, based on use of the model, that the first computer is within a first distance of the room. The component may be further configured to share information from the first computer when the first computer is within a first distance of the room. The component may be further configured to connect the first computer to projection or display equipment in the room when the first computer is in the room. The component may be further configured to determine that the user is a leader of the meeting, the component being further configured to unmute a microphone of the first computer, and to share the first computer's webcam. The component may be further configured to determine that the user is not a leader of the meeting, the component being further configured to mute the first computer's microphone. The meeting may be an online meeting in which the user is scheduled to participate without being present in a specific location.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method of configuring equipment for a meeting, the method comprising:
    surveying devices that are within wireless communication range of a first computer;
    creating a list of said devices that are within said wireless communication range of said first computer and respective signal strengths of said devices;
    using a model to determine said computer's physical proximity to a room in which said meeting is scheduled to take place, said model comprising data that represents a relationship between identities of devices that are within communication range of a given computer, signal strengths of those devices, and physical proximity of said given computer to said room;
    determining, based on use of said model, that said first computer is within a first distance of said room, said first computer being a user's device; and
    based on said first computer being within said first distance of said room, taking an action to have said user join said meeting prior to said first computer being in said room.

2. The computer-implemented method of claim 1, further comprising:
    determining that said user is a leader of said meeting; and
    based on said user being said leader of said meeting, unmuting a microphone of said first computer, sharing said first computer's webcam, and setting said user's presence to indicate that said user is not to be disturbed.

3. The computer-implemented method of claim 1, further comprising:
    determining that said user is not a leader of said meeting; and
    based on said user not being said leader of said meeting, muting said first computer's microphone.

4. The computer-implemented method of claim 1, further comprising:
    increasing a frequency at which said surveying of said devices occurs based on a finding that said first computer is within a second distance of said room, said second distance being greater than said first distance.

5. The computer-implemented method of claim 1, said acts further comprising:
    using a calendar of said user to determine that said user is scheduled to be in said meeting, said calendar indicating a location of said meeting.

6. The computer-implemented method of claim 1, said user having a plurality of devices, said first computer being one of said plurality of devices, there being a plurality of functions to be performed during said meeting, the method further comprising:
    determining that said first computer is to be used to perform a first one of said functions;
    determining that said plurality of devices other than said first computer are to be used to perform said plurality of functions other than said first function;
    configuring said plurality of device to perform respective functions that said plurality of devices have been chosen to perform.

7. The computer-implemented method of claim 1, said action comprising connecting said first computer to projection or display equipment in said room, sharing said first computer's desktop with participants in said meeting, and sharing documents to be used in said meeting.

8. A non-transitory computer-readable medium comprising executable instructions to configure equipment for a meeting, the executable instructions, when executed by a first computer, causing the first computer to perform acts comprising:

surveying devices that are within wireless communication range of said first computer;

creating a list of said devices that are within said wireless communication range of said first computer and respective signal strengths of said devices;

using a model to determine said computer's physical proximity to a room in which said meeting is scheduled to take place, said model comprising data that represents a relationship between identities of devices that are within communication range of a given computer, signal strengths of those devices, and physical proximity of said given computer to said room;

determining, based on use of said model, that said first computer is within a first distance of said room; and     based on said first computer being within said first distance of said room, starting a conference application on said first computer, sharing an application or desktop of said first computer, sharing documents, connecting said first computer to equipment in said room, or configuring audio or visual settings of said first computer.

9. The non-transitory computer-readable medium of claim 8, said first computer being a user's device, said acts further comprising:

determining that said user is a leader of said meeting; and     based on said user being said leader of said meeting, unmuting a microphone of said first computer, sharing said first computer's webcam, and setting said user's presence to indicate that said user is not to be disturbed.

10. The non-transitory computer-readable medium of claim 8, said first computer being a user's device, said acts further comprising:

determining that said user is not a leader of said meeting; and     based on said user not being said leader of said meeting, muting said first computer's microphone.

11. The non-transitory computer-readable medium of claim 8, said acts further comprising:

increasing a frequency at which said surveying of said devices occurs based on a finding that said first computer is within a second distance of said room, said second distance being greater than said first distance.

12. The non-transitory computer-readable medium of claim 8, said first computer being a user's device, said acts further comprising:

using a calendar of said user to determine that said user is scheduled to be in said meeting, said calendar indicating a location of said meeting.

13. The non-transitory computer-readable medium of claim 12, said calendar identifying a leader of said meeting and said documents that are to be used for said meeting.

14. The non-transitory computer-readable medium of claim 12, there being a user who participates in said meeting, said user having a plurality of devices, said first computer being one of said user's devices, said acts further comprising:

assigning different ones of said plurality of devices to perform different tasks for said user during said meeting.

15. A system for configuring equipment for a meeting, the system comprising:

a memory;

a processor; and a component that is stored in said memory, that executes on said processor, and that is configured to retrieve a calendar of a user, said component being further configured to create a list of devices that are within a wireless communication range of a first computer and respective signal strengths of said devices, determine using a model said computer's physical proximity to a room in which a meeting is scheduled to take place for said user, said model comprising data that represents a relationship between identities of devices that are within communication range of a given computer, signal strengths of those devices, and physical proximity of said given computer to said room, and determine that said user is scheduled to be in said meeting, said component being further configured to start an conference application, said component being further configured to automatically share a desktop of a first computer with participants in said meeting, or to automatically share an application with participants in said meeting, or to automatically share documents identified in said calendar with participants in said meeting.

16. The system of claim 15, said component being further configured to survey devices that are within wireless communication range of said first computer, said component being further configured to, said component being configured to determine, based on use of said model, that said first computer is within a first distance of said room, and, said component being configured to share information from said first computer when said first computer is within a first distance of said room.

17. The system of claim 16, said component being further configured to connect said first computer to projection or display equipment in said room when said first computer is in said room.

18. The system of claim 15, said component being further configured to determine that said user is a leader of said meeting, said component being further configured to unmute a microphone of said first computer, and to share said first computer's webcam.

19. The system of claim 15, said component being further configured to determine that said user is not a leader of said meeting, said component being further configured to mute said first computer's microphone.

20. The system of claim 15, said meeting being an online meeting in which said user is scheduled to participate without being present in a specific location.

\* \* \* \* \*